July 11, 1933.   P. E. HAWKINSON   1,917,262
APPARATUS FOR RETREADING TIRE CASINGS
Filed Dec. 20, 1932   2 Sheets-Sheet 1
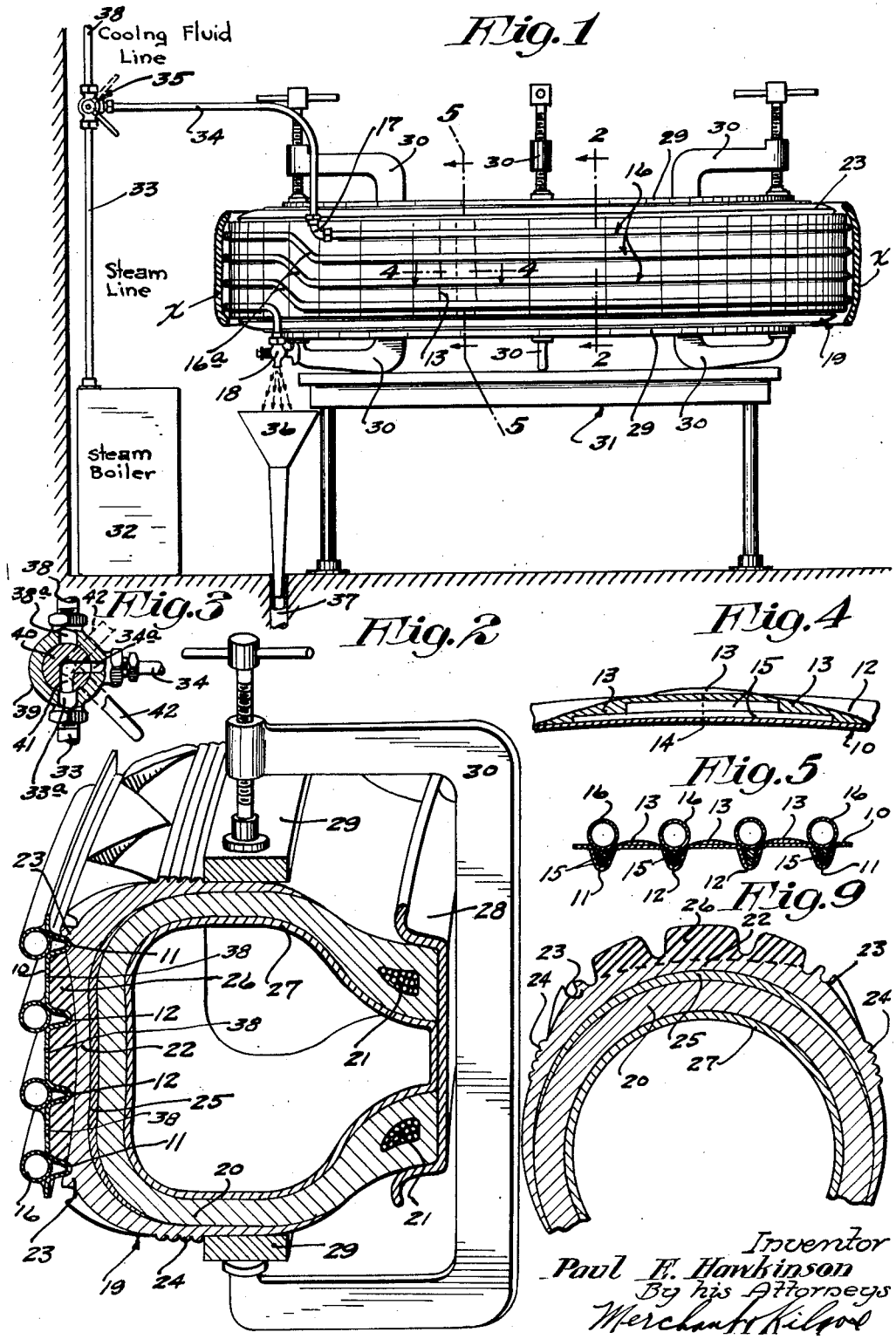
Inventor
Paul E. Hawkinson
By his Attorneys
Merchant & Kilgore

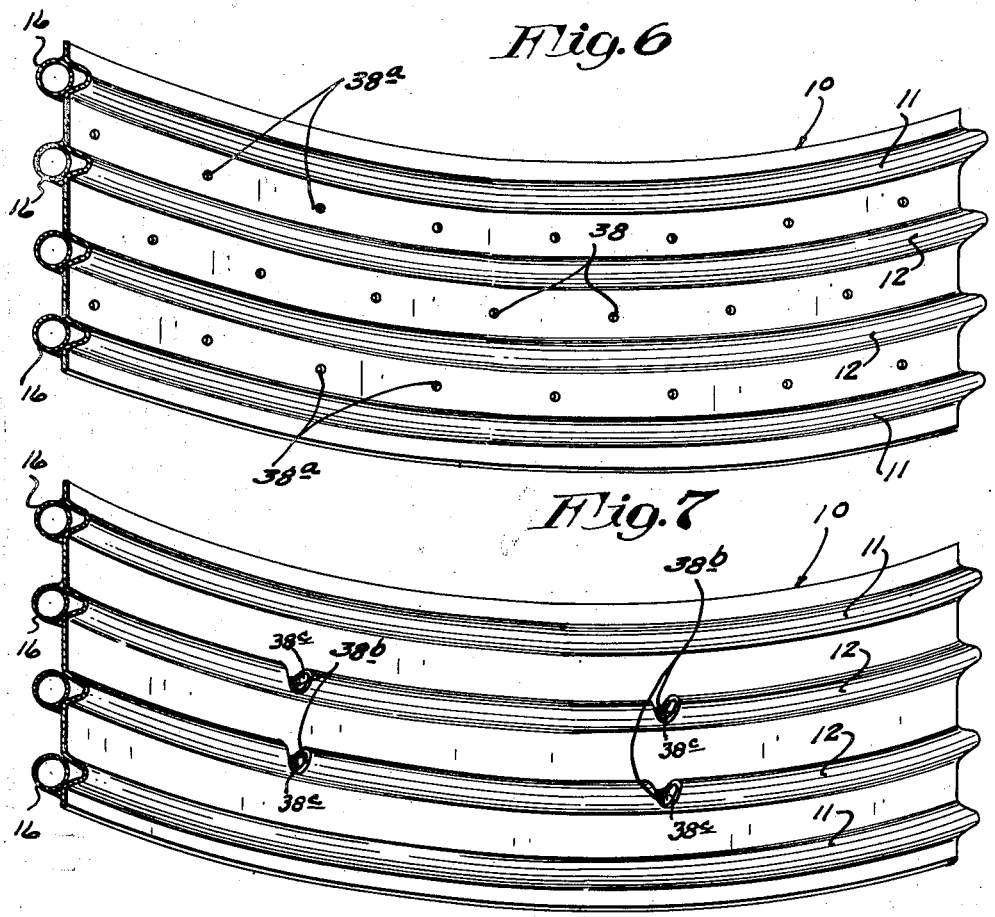
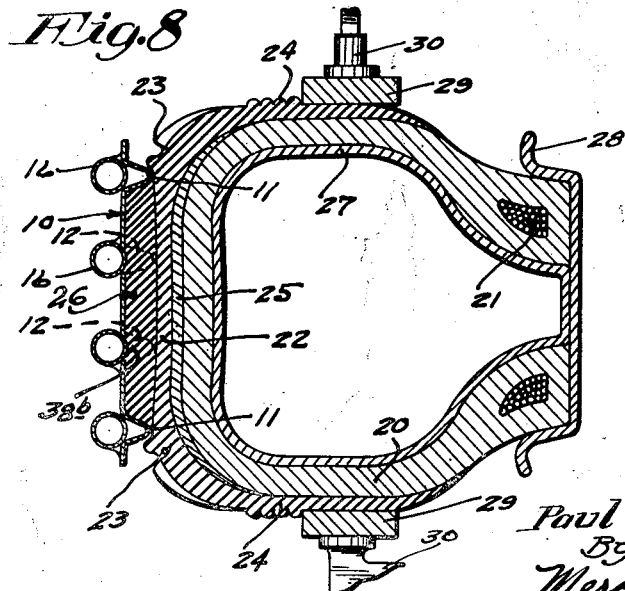

Patented July 11, 1933

1,917,262

UNITED STATES PATENT OFFICE

PAUL E. HAWKINSON, OF MINNEAPOLIS, MINNESOTA, ASSIGNOR TO PAUL E. HAWKINSON COMPANY, OF MINNEAPOLIS, MINNESOTA, A CORPORATION OF MINNESOTA

APPARATUS FOR RETREADING TIRE CASINGS

Application filed December 20, 1932. Serial No. 648,132.

This invention is in the nature of a continuation, in part, of my co-pending application Serial Number 537,324, filed May 14, 1931, and entitled "Method of retreading tire casings", and the invention disclosed herein relates, in part, to improvements on the mold structure disclosed in my co-pending application.

Among the important objects of the invention is the provision of a light-weight annular tire treading mold that can be easily and conveniently handled, will heat and cool rapidly, and has such a degree of resiliency that it will, if out of true round, be brought into true round by a circumferential expanding pressure of a tire placed therein. A further object of the invention is the provision for a relatively flexible mold, of a flexible heating means extended circumferentially of the mold and which will flex with the mold.

The above noted and other important objects and advantages will be made apparent from the specification and claims.

In the accompanying drawings, which illustrate the invention, like characters indicate like parts throughout the several views.

Referring to the drawings:

Fig. 1 is a view in side elevation of a complete mold incorporating a tire casing and further including certain associated apparatus, all parts being arranged as during a tread curing operation, some parts being broken away and sectioned;

Fig. 2 is an enlarged fragmentary perspective view sectioned on the line 2—2 of Fig. 1;

Fig. 3 is an enlarged detail view of a valve illustrated in Fig. 1, some parts being broken away and some parts being shown in section;

Fig. 4 is an enlarged fragmentary detail view sectioned on the horizontal line 4—4 of Fig. 1, some parts being omitted;

Fig. 5 is an enlarged transverse cross-sectional view taken on the line 5—5 of Fig. 1, and turned ninety degrees clockwise, some parts having been omitted;

Figs. 6 and 7 are fragmentary inside perspective views of the mold illustrating different provisions for venting the same;

Fig. 8 is a fragmentary sectional view, similar to Fig. 2, but taken on a transverse line passed through the gates or passages in the tread design forming ribs of the mold illustrated in Fig. 7 and illustrating the tire in an only partially expanded condition; and Fig. 9 is a sectional view of a tire casing after a new tread has been applied to its road-engaging crown portion with the novel apparatus.

A commercial form of the mold here illustrated is in the nature of an annular or ring-like member 10 of light and flexible metal formed adjacent its opposite edge portions to afford unbroken inwardly and circumferentially extended tread material confining surfaces 11 and formed intermediate said confining surfaces to afford inwardly extended tread design forming surfaces 12. The unbroken tread confining surfaces 11 are spaced a distance slightly greater than the width of a tread to be applied to the crown portion of a tire casing and are in the nature of endless cross-sectional U-shaped ribs. The intermediate design forming surfaces 12 may be of any desired form but preferably, and as illustrated, are in the nature of cross-sectional U-shaped inwardly and circumferentially extended ribs spaced laterally in respect to one another and the confining ribs. The ribs 11 and 12 form the inside of the mold with what may be termed maximum and minimum internal diameters, the maximum diameters being measured from points between the flanges or from the recess of the mold and the minimum diameters being measured from the inner surfaces of the ribs 11 and 12.

The commercial mold illustrated was formed from a flat strip of light and flexible sheet metal. The ribs 11 and 12 were partially formed in this sheet metal strip while said strip was in a longitudinally flat condition, this being accomplished by suitable dies applied thereto under pressure, and thereafter said ribs were completed and the strip simultaneously bent into circular formation by subjecting the strip to a rolling process consisting of a series of steps. After the ribs were completely formed and the strip had acquired the desired circular formation, the free ends of the strip were butted together at 14 and were permanently joined by brazing, substantially as illustrated at 13 in Figs. 1, 4 and 5.

Steel wires 15 were laid in the grooves formed by the U-shaped ribs 11 and 12 in overlapping relation to the butt joint and were brazed into an integral unit with the mold by the aforesaid brazing process. The ribs 11 and 12 stiffen the structure sufficiently to prevent collapse or any great degree of deformation of the structure under even relatively rough handling but nevertheless, leave the structure with such a degree of resiliency that it will, if out of true round, be brought into true round by circumferential expanding pressure of a tire placed therein.

The preferred means for heating the mold is in the form of a heating medium conducting heat radiating coil 16 applied about the exterior of the mold and having a spirally downward trend from the top edge toward the bottom edge of the mold in respect to Fig. 1. While the general formation of the coil 16 is that of a spiral, it will be noted that the several turns thereof are each seated throughout their major portions in a different one of the grooves formed by the ribs 11 and 12 and adjacent turns are connected by diagonally extended portions 16$^a$. At its top, in respect to Fig. 1, the coil 16 is provided with an inlet coupling 17 and at its bottom with an adjustable outlet restricting valve 18. The coil 16 is preferably of copper or other efficient heat-conducting and relatively ductile metal and is preferably secured to the mold by solder applied substantially all along one side thereof therebetween and the adjacent portions of the mold.

The tire casing 19 is of a well-known type generally used on automotive vehicles of the present day and comprises the customary cord carcass 20 having reinforced bead portions 21, a rubber covering forming a road-engaging crown tread portion 22, shoulder tread portions 23 adjacent opposite edges of the crown tread 22, side wall protecting portions 24, and a relatively soft and pliable breaker strip 25 interposed between the carcass and the crown and shoulder tread portions. The particular casing illustrated, as made evident by the drawings, is one on which much of the original road-engaging crown tread has been worn off or otherwise removed and on which the shoulder tread and side walls are in comparatively good condition and render the casing readily identifiable as to make.

Prior to the insertion of the tire into the mold the crown portion of the casing is cleaned and roughened, preferably by buffing, and thereafter a new strip of uncured tread material 26, preferably unvulcanized rubber, is cemented to the cleaned and roughened original crown portion 22 thereof intermediate the original shoulders 23. This strip of new tread material is of slightly less width than the space between the retaining flanges or ribs 11 and is of such thickness that it will, after being placed under pressure and formed by the mold, be thicker at its intermediate portion than the depth of the tread design forming surfaces 12 so that there will be some new tread material under the design forming ribs when the operation is complete.

The treaded casing will be assumed to be of greater normal diameter than the maximum diameter of the mold. Further, the casing may be assumed to have been placed in an operative position in the mold in accordance with the method taught in my previously referred to and identified co-pending application and which method, briefly described, comprises spreading the side walls of the casing laterally at circumferentially spaced points to circumferentially contract the crown portion thereof to a diameter less than the minimum internal diameter of the mold, placing the circumferentially contracted casing within the surrounding mold and thereafter relieving the positioned casing from laterally spreading pressure to permit circumferential expansion thereof against the mold. After having been placed in and permitted to expand under its own force against the mold, the casing is fitted with a suitable air bag or inner tube 27 and a rim 28 and is expanded, under pressure, against the mold by application of air in the air bag or tube 27. Under this expanding pressure the newly applied tread material 26 will form about the tread design forming surfaces 12 and the shoulder portions 23 of the original tread will be forced into engagement with the confining surfaces 11 of the mold and will confine the new tread material therebetween. The amount of air pressure to which the tube 27 is subjected and the resulting pressure applied to the new tread material will vary for tires of different sizes, different thicknesses of new treads and different compositions of tread materials, but will usually range from about ninety pounds per square inch, for relatively small tires, to about one-hundred and fifty pounds per square inch for large truck tires.

In order that the new tread material will form completely about the laterally spaced design forming surfaces 12 of the mold and seat tightly against the outermost surface of the mold, under the action of expanding pressure within the tire, it is necessary to provide some means for permitting escape of air from the space between the laterally spaced design forming surfaces 12 and in the drawings two different provisions for accomplishing this result are illustrated. Preferably, and as illustrated in Fig. 6, the design forming ribs or surfaces 12 are continuous and unbroken and venting of the space therebetween is accomplished by means of the vent apertures 38 communicating with the space between the design forming surfaces and located intermediate the turns of the heating coil 16. Similar vent apertures 38ª may also be provided for communication with the space between the design forming surfaces 12 and the confining surfaces 11 but these latter noted vent apertures may be dispensed with if the strip of newly applied tread material to be employed is of such thickness that it will become completely seated against the outermost or maximum diameter surface of the mold before the retaining surfaces 11 of the mold are brought into air-tight sealing contact with the shoulders of the casing, for in such instance, air in the space between the confining surfaces and adjacent design forming surfaces will be completely displaced by the new tread material and be discharged beneath the confining surfaces 11 before said confining surfaces have been brought into air-tight engagement with the shoulders of the casing.

For the arrangement illustrated in Figs. 7 and 8 the space between the laterally spaced design forming ribs 12 is vented through gates or passages 38ᵇ cut in the design forming ribs 12 at circumferentially spaced points thereabout. In this arrangement air in the space between the ribs 12 is displaced by the new tread material through the gates 38ᵇ therein into the spaces between the ribs 12 and 11 and is discharged therefrom beneath the confining ribs before said confining ribs have been brought into sealing contact with the shoulders of the casing. By reference to Fig. 8, which illustrates the mold as being provided with gates 38ª and the tire with its newly applied tread in a partially but not completely expanded condition, it will be noted that the new tread material 26 has been pressed into the mold and displaced substantially all of the air but that the confining ribs 11 have not yet been brought into sealing engagement with the shoulders of the casing. It will, of course, be obvious that under increased expanding pressure the shoulders 23 thereof will be forced into tight sealing contact with the confining ribs 11. When this latter noted method of venting the mold is employed the new tread material employed should be of such thickness that it will displace the air in the mold before the confining ribs are brought into sealing contact with the tire.

Since the ribs 12 are cross-sectionally U-shaped, the cutting of the gates 38ᵇ therein will form openings through the mold. These openings are closed by solder or the like 38ᶜ.

To insure tight and leak-proof contact between the confining ribs 11 and the original shoulders of the casing, it is often desirable to apply additional expanding pressure to the shoulders of the casing and this is illustrated as being accomplished here, as in my before identified application, by rings 29 applied to opposite side walls of the casing and cooperating clamps 30 applied at circumferentially spaced points and operative to hold the rings against lateral separation. The rings 29 and clamps 30 are applied before any great amount of air pressure is applied in the tube and are tightened down until the casing is in a laterally narrowed condition substantially as illustrated. When the casing is further inflated, the side walls being held against lateral separation, will cause increased radial expansion of the shoulders and this increased radial expansion of the shoulders will cause the same to form around the confining ribs or surfaces 11. In many instances a sufficiently tight contact between the shoulders of a tire and confining surfaces can be obtained without holding the side walls of the tire against lateral expansion and in such cases the use of the rings 29 and clamps 30 may be dispensed with.

For the curing or vulcanizing operation, the mold is preferably disposed in a horizontal position so that the heating coil will drain radially and all points about the circumference of the mold will be heated substantially evenly. During the curing operation the mold with the newly treaded tire and clamping devices 29 and 30 may be placed on a suitable base of support such, for example, the table illustrated and indicated by 31. The inlet coupling 17 of the heating coil 16 is connected to a source of heating medium, illustrated as being in the form of a high pressure steam boiler or generator 32, through a feed line comprising sections 33 and 34 having interposed therebetween a control valve 35. The feed line section 34 is preferably relatively flexible to permit quick coupling onto the heating coil without requiring critical positioning of the mold.

The complete exterior surface of the mold is insulated against heat loss during the curing process by flexible insulating material preferably comprising a plurality of thicknesses of wool blanket material which may be permanently applied to the mold but will preferably be removably applied to the mold just prior to each curing operation and thereafter removed. This means of insulating the mold against heat loss has been found very efficient and is further highly desirable in that it does not add greatly to the weight of the structure if permanently applied thereto, may be readily removed if desired and in any event will permit any required amount of flexing of the mold. For detachably fastening the free ends of the blanket together for temporary application to the mold suitable hooks, pins or clamping devices, not shown, may be employed.

When the mold is thus connected and insulated the curing operation is started by turning on the steam pressure by means of the valve 35. Steam is passed through the coil 16 and will be discharged from the lower end thereof through the valve 18 into a suitable receptacle illustrated as being in the form of a funnel 36 projecting from a drain 37, the velocity of the steam passed through the coil being controlled by the valve 18.

Due to the light-weight of the mold it will become heated to a curing or vulcanizing temperature almost instantly, even if cold when the steam is turned on, and the curing operation can, therefore, be timed from the instant steam at a predetermined temperature and/or pressure is supplied to the heating coil and the difference in the time required to bring the mold up to a curing temperature from various different starting temperatures will be so little as to be of no material consequence. When the predetermined correct time interval allowed for proper curing has passed, the steam will be cut-off by the valve 35.

As is well-known, it is highly desirable to cool the newly treaded tires under pressure in the mold and when this apparatus is employed this practice can be efficiently and economically carried out for the mold, due to its formation and light construction, will rapidly cool below a vulcanizing temperature and to a handling temperature by natural radiation into the surrounding air, this being particularly true if the insulating blanket is removed at the completion of the timed curing period. While the time required for the mold and tread to cool by natural radiation is always comparatively short, it will, of course, vary with changes in room temperatures, varying degrees of air circulation and with different sizes and thicknesses of tires and newly applied treads and will, therefore, extend the timed curing period to a varying extent which is difficult to calculate or control. This extension of the timed curing period will not usually be sufficient, under any of the changeable conditions, to seriously affect the quality of the new tread or greatly delay successive curing operations in the mold, but where highly accurate timing is important or it is desired to use the mold for a rapid succession of curing operations, the cooling period can be greatly reduced by circulating cold water through the heating coil for a short interval after turning off of the steam.

For the purpose of rendering the heating coil readily connectible to a source of cold water the valve 35 is illustrated as being of the three-way type and has one side connected to a cold water supply pipe 38. By particular reference to Fig. 3, it will be seen that the valve 35 includes a shell 39 having an inlet port 33ª communicating with the steam line section 33, an inlet 38ª communicating with the water line 38, and an outlet 34ª communicating with the steam line section 34.

Rotatably mounted within the valve shell 39 is a valve core 40 having an L-shaped bore 41 and arranged to be directly controlled by an operating handle 42. It will be seen that when the handle 42 is in the position shown by full lines, that the sections 33 and 34 of the steam line will be in communication and steam will be delivered to the mold, that when the handle 42 is rotated forty-five degrees upwardly, as shown by dotted lines, the water line 38 will be in communication with the steam coil, and when the handle is moved either to a vertical, upper or lower position, both the steam and cold water will be cut-off from the heating medium.

It will be obvious that with the quick heating always obtainable and the exceedingly rapid cooling made possible by running cooling fluid through the coil 16 after turning off the steam, that the curing periods can be very accurately controlled and that a minimum of time will be wasted by waiting for the mold to heat or cool and that all handling of the mold may be done while the mold is in a cold condition. It will further be appreciated that there will be no necessity of removing the tire from the mold while hot.

Heavily constructed and cumbersome mold equipment generally employed for treading tires requires such long periods to become heated and cooled that it is usually necessary, in order to secure reasonably accurate timing of the curing operation and to eliminate great loss of time between successive curing operations, to preheat the mold to a desired vulcanizing temperature before insertion of a tire to be cured, to insert the tire into the mold while the mold is in a heated and hard to handle condition, and to remove the tire from the mold while both tire and mold are in a very hot condition. This practice is objectionable in that it requires handling the heavy equipment while very hot and further because new tread material is apt to become scorched or overcured as a result of being placed into sudden contact with very hot surfaces of the mold. Another objectionable feature of the above noted old procedure, particularly when practiced with previously employed types of molds, is that portions of the treads of newly treaded tires, that are removed from the mold in a very hot condition, are apt to blow loose from the tires upon being relieved from pressure in the mold, this being caused by a small amount of moisture confined between the new tread and tire and expanded to create great pressure when the tire is heated. If, however, tires are permitted to cool under pressure in the mold, as is highly practical when my improved mold is employed, the tread will be held in place until the pressure, caused by the heated moisture, has subsided under cooling action and blowing will be prevented.

The mold and heating coil therefore, here illustrated, will cool nearly evenly at all points under the action of cold water passed through the heating coil while it and the mold are very hot, that no damage will be done to either the mold or coil, as a result of contraction, whereas if cold water were rapidly forced into a heavy cast mold, of the usual construction, there would be great danger of cracking the structure due to uneven cooling and contraction of different portions. The flexibility of the mold and heating coil in the arrangement illustrated is, of course, important factors in rendering the structure capable of rapid cooling without damage.

The heating coil 16, while described as being of copper, may be of other material having suitable heat conductivity but will preferably be formed of metal having a much greater degree of ductility than the mold and copper has been found very satisfactory. The importance of this feature lies mainly that if the mold should break under excessive pressure thereagainst of a tire placed therein the steam coil, if of ductile metal such as copper, will stretch at the point of the break and permit sufficient separation of the mold to relieve the mold from such expanding pressure as would be required to break the steam coil. The heating coil 16, due to its ability to stretch without breaking, confines expanding movements of a mold, broken by excessive internal expanding pressure, within limits safe to persons or property in close proximity to the mold and prevents undirected dangerous discharge of steam.

It will be appreciated from the foregoing that it is material in the practicing of the instant invention that the mold be continuous and unbroken circumferentially, and while I have shown and described a preferred embodiment of the invention it is obvious that any modified construction thereof having the function of the integral cylinder-like mold defined by the claims will not depart from the spirit of the claims.

What I claim is:

1. A tire treading device comprising an integral cylinder-like mold of relatively thin metal formed near its opposite edges with cross-sectionally U-shaped inwardly extended unbroken tread material confining flanges spaced a distance slightly greater than the width of a tread to be applied to the crown portion of a tire, and said thin metal mold being free of tire side wall engaging portions and formed between said tread confining surfaces with cross-sectionally U-shaped inwardly extending tread design forming surfaces, said continuous confining surfaces and said tread design forming surfaces stiffening the structure but leaving the same with such resilience that it will, if out of true round, be brought into true round by circumferential expanding pressure of a tire placed therein, and heating means extending circumferentially of said mold.

2. A tire treading device comprising an integral cylinder-like mold of relatively thin metal formed near its opposite edges with cross-sectionally U-shaped inwardly extended unbroken tread material confining flanges spaced a distance slightly greater than the width of a tread to be applied to the crown portion of a tire, said confining flanges stiffening and reducing resilience of the mold but leaving the structure with such a degree of flexibility that, if out of true round, it will be brought into true round by circumferential expanding pressure of a tire placed therein, and heating means extending circumferentially of said mold between the confining flanges thereof.

3. A tire treading device comprising an integral cylinder-like mold of flexible sheet metal having marginal flanges defining a tread material confining space therebetween, said mold being free of tire side wall engaging portions, flexible heating means extended circumferentially of the mold for applying heat thereto, and flexible heat insulating means extending about the exterior of the mold and heating means.

4. A tire treading device consisting of an integral cylinder-like mold having continuous tread material confining flanges inwardly projecting from the marginal portions of said mold, said flanges being of such construction and extent as to make only line contact with laterally spaced shoulder portions of a tire and support the mold over the crown portion and out of contact with side wall portions of the tire, and heating means extending circumferentially of the mold.

5. A tire treading device consisting of an integral cylinder-like mold having continuous tread material confining portions projecting inwardly from maginal portions of said mold, said portions being of such construction and extent as to make circumferential sealing contact with the shoulders only of a tire to support the mold over the tire crown and leave the side wall portions thereof exposed, means to vent the mold between the tread confining portions thereof, and heating means extending circumferentially of said mold between the marginal portions thereof.

6. A tire treading device comprising an integral mold substantially flat in cross section and composed of relatively light flexible material such that it will be brought into true round by circumferential expanding pressure of a tire placed therein, said mold having continuous tread material confining portions projecting inwardly from marginal portions of said mold to make line contact with laterally spaced shoulder portions of a tire, whereby to support said mold above the crown portion of the tire only, and heating means extending circumferentially of the mold.

7. A tire treading device comprising an integral mold substantially flat in cross section and composed of relatively light flexible material such that it will be brough into true round by circumferential expanding pressure of a tire placed therein, said mold having continuous tread material confining portions projecting inwardly from marginal portions of said mold to make line contact with laterally spaced shoulder portions of a tire, whereby to support said mold above the crown portion of the tire only, and a continuous flexible heating means extending circumferentially and spirally of the mold.

8. A tire treading device comprising an integral mold substantially flat in cross section and composed of relatively light flexible material such that it will be brought into true round by circumferential expanding pressure of a tire placed therein, said mold having continuous tread material confining portions projecting inwardly from marginal portions of said mold to make line contact with laterally spaced shoulder portions of a tire, whereby to support said mold above the crown portion of the tire only, and a heating medium conducting and radiating conduit of ductile material coiled circumferentially about said mold.

9. A tire treading device comprising a cylindrical mold formed of relatively light material having inwardly extending unbroken annular tread material confining surfaces each disposed adjacent an opposite edge of the mold, said retaining surfaces being spaced a distance slightly greater than the width of a tread to be applied to the crown portion of a casing, and said mold being further formed with vent apertures communicating with the space between the spaced tread retaining surfaces.

10. The structure defined in claim 9 in further combination with means for applying heat circumferentially of the mold intermediate the vent apertures.

11. A tire treading device comprising a cylindrical mold formed of relatively light material having inwardly extending unbroken annular tread material confining flanges each disposed adjacent an opposite edge of the mold, said retaining flanges being spaced a distance slightly greater than the width of a tread to be applied to the crown portion of a casing, said mold having vent apertures communicating with the space between the spaced tread retaining surfaces, and heating means extending spirally about the exterior of the mold intermediate the said vent apertures.

12. A tire treading device comprising a cylindrical mold formed of relatively light material having inwardly extending unbroken annular tread material confining flanges each disposed adjacent an opposite edge of the mold, said retaining flanges being spaced a distance slightly greater than the width of a tread to be applied to the crown portion of a casing, said mold having vent apertures communicating with the space between the spaced tread retaining surfaces, and a steam conducting heat radiating conduit applied directly to and extending spirally about the exterior of the mold intermediate the said vent apertures.

In testimony whereof I affix my signature.

PAUL E. HAWKINSON.